Oct. 1, 1946.　　　L. A. SPIEVAK　　　2,408,586

ADJUSTABLE HOLD-DOWN DEVICE

Filed March 29, 1943

INVENTOR
Louis A. Spievak
BY Harold W. Mattingly
ATTORNEY

Patented Oct. 1, 1946

2,408,586

UNITED STATES PATENT OFFICE 2,408,586

ADJUSTABLE HOLD-DOWN DEVICE

Louis A. Spievak, West Los Angeles, Calif.

Application March 29, 1943, Serial No. 480,913

1 Claim. (Cl. 144—290)

My invention relates to hold-down devices and has particular reference to a device to be secured upon or attached to a work table to engage and hold workpieces down upon the table in a desired position to permit the performance of manufacturing operations upon such workpieces.

In industries such as automobile and aircraft manufacturing it is the common practice to manufacture large quantities of identical parts by building jigs to be associated with various machines which are to perform manufacturing operations upon these parts to locate the parts on the machine in a desired position for the performance of such manufacturing operations. The problem which is presented is to hold the various workpieces in position in the jigs or upon designated portions of a work table of the machine, with assurance that the workpiece will not be readily displaced from the desired position during the performance of the work. For this purpose various types of hold-down devices or quick-acting clamps have been devised, a typical example being that shown in my copending application Serial No. 405,964, filed August 8, 1941. The common characteristic of these hold-down devices is the use of a bar or workpiece engaging member which is held in a clamped position on the workpiece by means of cams or toggle joints by which a handle may readily move the clamping bars into and out of engagement with the workpiece and to hold the clamping bars in their clamping positions without the necessity of employing additional locking or holding mechanisms.

Heretofore the clamps or hold-down devices have been specifically designed to dispose the clamping bar a predetermined distance away from the work table whenever it is in its clamped position, requiring either the use of spacing blocks between the workpiece and the table or between the clamping bar and the workpiece if the thickness of the workpiece does not coincide with the predetermined distance between the clamping bar and the work table for which a clamp or hold-down device has been specifically designed.

It is therefore an object of my invention to provide a hold-down of the type described, in which the distance between the clamping bar and the work table when the clamping bar is in working or clamping position may be readily adjusted to adapt the hold-down device to workpieces of an infinite number of different thicknesses.

Another object of my invention is to provide a hold-down device of the class described, in which the adjustment may be readily made to dispose a clamping bar in a desired position and thereafter the operation of the clamping bar to clamping position will always dispose the clamping bar in the adjusted position.

Another object of my invention is to provide a hold-down device of the character described wherein the adjustment may be altered from time to time or the clamp may be adjusted initially to a desired position and the adjustment is then permanently fixed.

Other objects and advantages of my invention will be apparent from a study of the following specification, read in connection with the accompanying drawing, wherein Fig. 1 is a perspective view of an adjustable hold-down device constructed in accordance with my invention;

Figure 1:
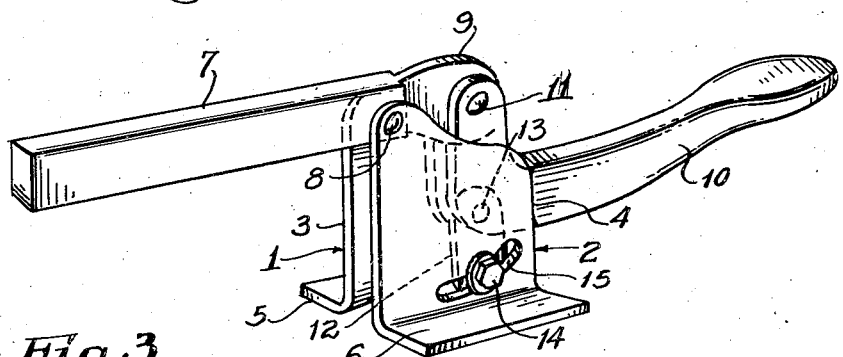

Referring to the drawing, I have illustrated in Fig. 1 a typical hold-down device constructed in accordance with my invention as comprising a pair of support members 1 and 2 which may be constructed as angular brackets having vertically extending portions 3 and 4, respectively, and horizontally extending foot portions 5 and 6, respectively. The foot portions 5 and 6 are adapted to be secured to the surface of a work table or to the work supporting surface of a machine which is to be used to perform a manufacturing operation upon a workpiece. The securing of the feet 5 and 6 may be accomplished in any desired manner such as by welding the feet directly to the work table or work supporting surfaces.

Figure 4:
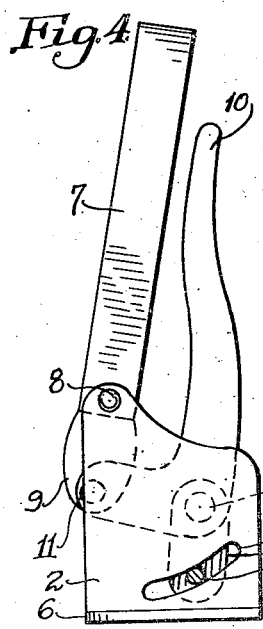
Fig. 4 is a side elevational view of the hold-down device illustrated in Figs. 1 through 3, and illustrating the position of the clamping bar and handle when the clamping bar is in its released or non-working position.

The supports 1 and 2 are spaced horizontally from each other a sufficient distance to permit the interposition therebetween of a clamping bar 7 pivoted to the supports 1 and 2 by means of a pivot pin 8 so as to permit the clamping bar to be moved from its horizontally extending position, as shown in Fig. 1, to a substantially vertically extending position, as shown in Fig. 4. The clamping bar 7 constitutes a lever fulcrumed at its pivot pin 8, the opposite end 9 of the bar 7 being connected to a handle 10 as by means of a pivot pin or rivet 11 by which the handle and bar may rotate relative to each other.

The handle 10 is supported upon the supports 1 and 2 as by means of a link 12 pivoted as indicated at 13 to the handle 10 and also pivoted upon a bolt 14 adapted to extend through matching slots 15 in the supports 1 and 2.

The form of handle shown in Figs. 1 through 4 is generally that of a bellcrank, the longer lever of the bellcrank constituting the direct handle portion to be engaged and manipulated by the hand of an operator while the short leg of the bellcrank extends substantially at right angles to the handle portion so that when the clamping bar 7 is in its clamping or working position, as shown in Fig. 1, a line extending through the axes of the pivot pins or rivets 11 and 13 and the bolt 14 will be a straight line, the short leg of the bellcrank and the link 12 constituting in effect a toggle.

Figures 2, 3:
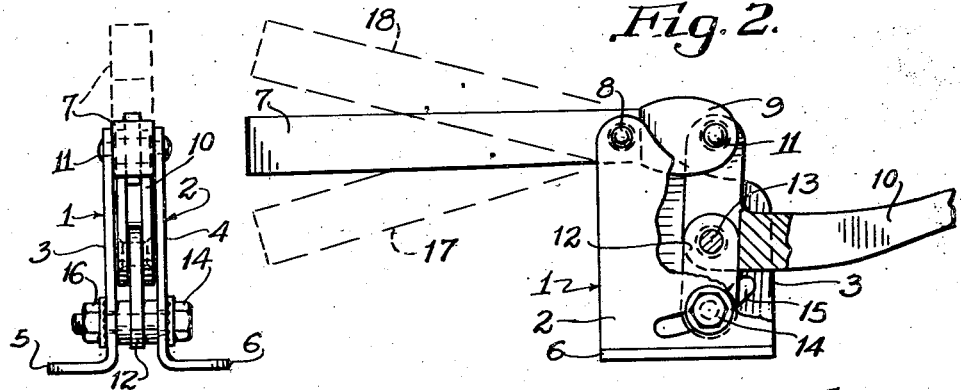
Fig. 2 is a side elevational view, partly in section, of the hold-down device shown in Fig. 1.
Fig. 3 is an end elevational view of the hold-down device illustrated in Figs. 1 and 2.

To facilitate manufacture and assembly of the type of hold-down device illustrated in Figs. 1 through 4, the short leg of the bellcrank constituting the handle 10 may be slotted or bifurcated, as shown in Figs. 1 and 2, so that the link 12 may be made of a thickness considerably less than the thickness of the handle member 10 and may be interposed in the slot formed by bifurcating the handle.

With the clamp structure as thus far described, it will be apparent that moving the handle to a substantially horizontal position, as is shown in Fig. 1, will cause the clamping bar to rotate about its pivot pin 8 until the clamping bar is disposed in a substantially horizontal position as shown in Fig. 1 and in this position the toggle formed by the handle and link will be "straightened out" and will act to lock the clamping bar 7 in its clamping or working position. In this position the handle is substantially horizontal and lies below the upper limits of the support members 1 and 2, thus being out of any possible obstructing position. Likewise movement of the handle 10 from the position shown in Fig. 1 to the position shown in Fig. 4 will swing the clamping bar 7 about its pivot 8 until the bar is disposed in a substantially vertical position, as shown in Fig. 4, and in this position both the handle and the clamping bar are disposed in positions which will not obscure the surface of the work table and will leave the work table accessible to the workman for the placing of a new workpiece or the removal of a finished piece.

It will be observed that the slots 15 in the supports 1 and 2 are formed on the arc of a circle and the shape of the slots is so disposed upon the supports that one end of the slot is considerably higher from the work table than is the other end of the slot. Thus if the bolt 14 is shifted from the position shown in Figs. 1, 2 and 4, and is disposed in some other position within the slot, the working position of the clamping bar 7 will not be horizontal but will form a greater or lesser angle relative to the work table surface. Thus by loosening the nut 16 on the bolt and shifting the bolt rearwardly of the slot 15, the working position of the outer end of the clamping bar 7 may be disposed closer to the work surface, as shown in the dash line position at 17 in Fig. 2, to accommodate the hold-down device for engaging and holding a thinner or narrower workpiece than would be possible with the clamping bar in its horizontal position. Likewise shifting the bolt forwardly in the slot 15 will dispose the working position of the outer end of the clamping bar at a greater distance away from the work table, such as is shown in the dash line position indicated at 18 in Fig. 2, thus accommodating the clamp to workpieces of greater thickness.

Once the bolt 14 has been shifted sufficiently to make the working position of the clamping bar 7 adapted for a particular thickness of workpiece, the nut 16 may be tightened with assurance that upon each operation of the handle 10 the clamping bar will move to the new working position.

Figure 5:
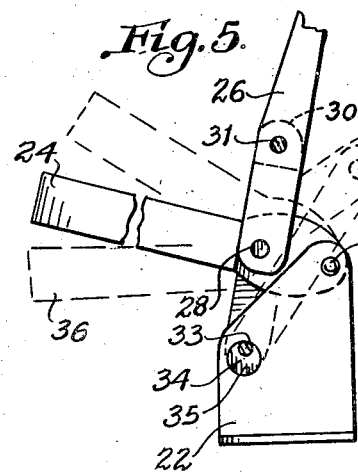
Fig. 5 is a side elevational view of a modified type of adjustable hold-down device embodying my invention.
Figure 6:
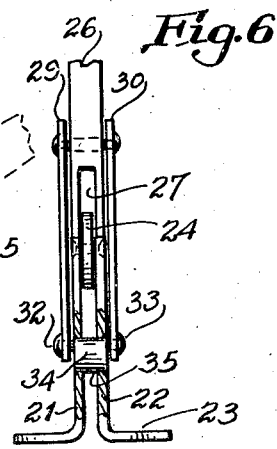
Fig. 6 is a front view, partly in section, of the hold-down device illustrated in Fig. 5.

In Figs. 5 and 6 I have illustrated a modified form of clamp embodying my invention as comprising a pair of supports 21 and 22 which, like the supports 1 and 2, may be provided with horizontally extending feet 23 adapting the supports to be secured to a work table or working surface. In this form of hold-down device the clamping bar 24 is pivotally mounted as by a pivot pin or rivet 25 to the vertically extending portions of the supports 21 and 22 to swing from a clamping or working position, as shown in full lines in Fig. 5, to a released or non-working position, as shown in dotted lines in Fig. 5.

The clamping bar 24 is moved between these positions by means of a handle 26 having its lower end slotted as indicated at 27 to straddle the rearward portion of the clamping bar 24 to which it is pivoted by means of a pivot pin or rivet 28. The handle 26 is coupled to the supports 21 and 22 by means of a pair of links 29 and 30 which may extend one on each side of the handle 26 to which the links are pivotally connected by means of a pivot pin or rivet 31. The lower end of the links 29 and 30 engage crank pins 32 and 33 formed upon opposite ends of a pin or section of rod 34, the crank pins being disposed eccentrically with respect to the axis of the pin 34. The pin 34 is rotatably mounted in circular openings in the supports 21 and 22 so that the pin 34 may be rotated relative to the supports.

With the construction thus far described, movement of the handle 26 in a counterclockwise direction will swing the clamping bar 24 to its working position, as illustrated in full lines in Fig. 5, at which time the pivots 31, 28 and 33 will be disposed in a straight line, the combination constituting a toggle joint in which the toggle is "straightened out." Movement of the handle 26 in a clockwise direction will first "break" the toggle and then will cause the clamping bar 24 to be moved in a clockwise direction to its released or non-working position, as shown in dotted lines in Fig. 5.

The space between the outer end of the clamping bar 24 and the surface of the work table may be readily adjusted by rotating the pin 34 in its openings 35 to move the crank pins 33 to a position closer to or further away from the work table surface. Any movement of the crank pins 33 further toward the work table surface will cause the working position assumed by the clamping bar 24 to be with its outer end closer to the work table surface, such as is indicated in dash lines 36 in Fig. 5.

It will be apparent therefore that the pin 34 may be rotated until the working position of the clamping bar 24 assumes any desired position adapted for the particular thickness of the workpiece with which it is to be associated. The pin may then be fixed against inadvertent movement to some other position as by means of welding the ends of the pin 34 to the supports 21 and 22.

It will therefore be observed that I have provided a clamp or hold-down device which may be readily adjusted to fit a particular thickness of workpiece and once so adjusted the adjustment may be maintained either temporarily, as by the bolt and nut construction shown in Figs. 1 through 4, or the adjusted position may be permanently fixed, as indicated in Figs. 5 and 6. In either case the manufacture of clamps or hold-down devices is facilitated, a single design of which may be manufactured in large quantities and then fitted to different distances between the work table and the clamping bar by merely fixing the position of the adjusting device.

While I have shown and described the preferred embodiment of my invention, I do not desire to be limited to any of the details of construction shown and described herein, except as defined in the appended claim.

I claim:

In a hold-down device for securing a workpiece to a working surface, the combination of: a support member adapted to rest upon the working surface, a clamping bar; means pivoting said clamping bar upon said support member for movement between a working position disposing the end of the bar a predetermined distance above the working surface to engage and clamp a workpiece against the working surface and a non-working position disposing the end of said bar at a greater distance from said surface; a handle member for moving said bar between said two positions; means pivotally interconnecting said handle with said bar; and means pivotally connecting said handle to said support including a pivot member engageable with said support, a slot in said support for receiving said pivot member, said slot extending at an acute angle relative to the working surface whereby positioning of said pivot member at different positions along said slot will fix the working position of the end of said bar at different predetermined distances above said working surface to thereby accommodate workpieces of different thicknesses, and means for locking said pivot means in any position along said slot.

LOUIS A. SPIEVAK.